(12) United States Patent
Xu et al.

(10) Patent No.: US 11,408,737 B2
(45) Date of Patent: Aug. 9, 2022

(54) SYSTEM AND METHOD FOR DETERMINING A VEHICLE ORIENTATION (71) Applicant: BEIJING DIDI INFINITY TECHNOLOGY AND DEVELOPMENT CO., LTD., Beijing (CN)

(72) Inventors: Hailiang Xu, Beijing (CN); Weihuan Shu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 299 days.

(21) Appl. No.: 16/746,952

(22) Filed: Jan. 19, 2020

(65) Prior Publication Data
US 2020/0149893 A1 May 14, 2020

Related U.S. Application Data (63) Continuation of application No. PCT/CN2017/095339, filed on Jul. 31, 2017.

(51) Int. Cl.
*G01C 21/16* (2006.01)
*G01C 21/28* (2006.01)
(Continued)

(52) U.S. Cl.
CPC .......... *G01C 21/165* (2013.01); *G01C 21/28* (2013.01); *G01S 19/47* (2013.01); *G01S 19/53* (2013.01)

(58) Field of Classification Search
CPC ........ G01C 21/00; G01C 21/10; G01C 21/12; G01C 21/16; G01C 21/165; G01C 21/26;
(Continued)

(56) References Cited

U.S. PATENT DOCUMENTS

2003/0182077 A1* 9/2003 Emord ................ G01C 21/165
702/150
2011/0125404 A1 5/2011 Czompo
(Continued)

FOREIGN PATENT DOCUMENTS

| CN | 105959917 A | 9/2016 |
| CN | 106918831 A | 7/2017 |
| KR | 20030074877 A | 9/2003 |

OTHER PUBLICATIONS

International Search Report in PCT/CN2017/095339 dated Apr. 27, 2018, 4 pages.
(Continued)

*Primary Examiner* — Geepy Pe
*Assistant Examiner* — Michael Allen Brace, Jr.
(74) *Attorney, Agent, or Firm* — Finnegan, Henderson, Farabow, Garrett & Dunner LLP (57) ABSTRACT Embodiments of the present disclosure are directed to systems and methods for determining a vehicle orientation. In one implementation, a computer-implemented method for determining a vehicle orientation may include receiving a first set of satellite signals associated with a connected device positioned relatively stationary with respect to a vehicle. The method may also include determining that the first set of satellite signals is insufficient to determine the vehicle orientation. The method may further include determining the vehicle orientation based on a first relative orientation of the connected device relative to the vehicle and a second relative orientation of the connected device relative to a reference object.

16 Claims, 8 Drawing Sheets

(51) Int. Cl.
 *G01S 19/47* (2010.01)
 *G01S 19/53* (2010.01)
(58) Field of Classification Search
 CPC ......... G01C 21/28; G01S 19/00; G01S 19/38;
 G01S 19/39; G01S 19/42; G01S 19/45;
 G01S 19/47; G01S 19/53
 See application file for complete search history.

(56) References Cited

U.S. PATENT DOCUMENTS

| | | |
|---|---|---|
| 2013/0009791 A1 | 1/2013 | Yoshioka |
| 2013/0081442 A1* | 4/2013 | Basir ................. G01P 21/00 73/1.38 |
| 2014/0129136 A1* | 5/2014 | Celia ................. G01S 19/49 701/445 |
| 2015/0233718 A1* | 8/2015 | Grokop ................. G06Q 40/08 701/501 |

OTHER PUBLICATIONS

Written Opinion in PCT/CN2017/095339 dated Apr. 27, 2018, 4 pages.

\* cited by examiner

SYSTEM AND METHOD FOR DETERMINING A VEHICLE ORIENTATION

CROSS REFERENCE TO THE RELATED APPLICATIONS

The present application is a continuation of International Application No. PCT/CN2017/095339 filed on Jul. 31, 2017, designating the United States of America. The entire contents of the above-referenced application are incorporated herein by reference.

TECHNICAL FIELD

The present disclosure relates to positioning techniques, and more particularly, to systems and methods for determining a vehicle orientation.

BACKGROUND

Most drivers nowadays use navigation apps on mobile devices, such as a smartphone or a tablet, for directions. The mobile devices are typically mounted inside the vehicle in a cradle or other mounting structures affixed to the vehicle. The navigation apps typically present a navigation map to the drivers as they drive. Most navigation apps use Global Positioning System (GPS) signals received by the mobile device to determine and update the location of the mobile device and thus the location of the vehicle, and visually represent the location in the navigation map. Using the GPS signals, the navigation apps typically show the navigation course or the general direction in which the vehicle is moving. For example, the positions of the vehicle over a period of time can be tracked using the GPS signals. Thus, the moving course and moving direction of the vehicle over the period of time can be determined from the position change of the vehicle and be visually represented in the navigation map.

It is often desirable to determine the direction the vehicle is pointing to, i.e., the orientation of the vehicle, during the course of navigation. For example, vehicle orientation is typically considered when routing a trip. When the vehicle is heading the wrong direction, or making a wrong turn, the navigation app may instruct the driver to make a U-turn, or reroute, based on the vehicle orientation. The vehicle orientation may also be displayed to the driver, to assist the driver to maneuver the vehicle, and/or further improve the safety of driving. However, because the accuracy of the localization based on GPS signals (or satellite signals of other global navigation systems) is currently beyond 3 meters, GPS signals alone may not be sufficient to determine the vehicle orientation in many situations. For example, when the vehicle turns, typically at reduced speed, the position change of the vehicle during the turn may be too small to be captured by GPS accurately. Also, in some navigation apps, the location of the vehicle in the navigation map may jump around the real location for a temporary period of time due to lack of sufficient or reliable GPS signals. In these situations, the vehicle orientation cannot be accurately determined using GPS signals received by the mobile device.

The disclosed methods and systems are designed to address at least some issues discussed above.

SUMMARY

Embodiments of the present disclosure include methods, systems, and devices for determining a vehicle orientation. The exemplary embodiments allow for determining the vehicle orientation when the vehicle moves at reduced speeds and/or when the satellite signals are insufficient for locating the vehicle or determining the vehicle orientation with desired accuracy.

An aspect of the present disclosure provides a computer-implemented method for determining a vehicle orientation. The method may include receiving a first set of satellite signals associated with a connected device positioned relatively stationary with respect to a vehicle. The method may also include determining that the first set of satellite signals is insufficient to determine the vehicle orientation. The method may further include determining the vehicle orientation based on a first relative orientation of the connected device relative to the vehicle and a second relative orientation of the connected device relative to a reference object.

Another aspect of the disclosure provides a system for determining a vehicle orientation. The system may include at least one storage device configured to store at least one or more set of satellite signals, orientations, and/or movement measurements of a vehicle. The system may further include a processor. The processor may be configured to receive a first set of satellite signals associated with a connected device positioned relatively stationary with respect to a vehicle. The process may also be configured to determine that the first set of satellite signals is insufficient to determine the vehicle orientation. The process may further be configured to determine the vehicle orientation based on a first relative orientation of the connected device relative to the vehicle and a second relative orientation of the connected device relative to a reference object.

Yet another aspect of the disclosure provides a non-transitory computer-readable medium. The non-transitory computer-readable medium contains instructions that, when executable by at least one processor, cause the at least one processor to perform a method for determining a vehicle orientation. The method may include receiving a first set of satellite signals associated with a connected device positioned relatively stationary with respect to a vehicle. The method may also include determining that the first set of satellite signals is insufficient to determine the vehicle orientation. The method may further include determining the vehicle orientation based on a first relative orientation of the connected device relative to the vehicle and a second relative orientation of the connected device relative to a reference object.

Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

DETAILED DESCRIPTION

Reference will now be made in detail to embodiments and aspects of the present disclosure, examples of which are illustrated in the accompanying drawings. Where possible, the same reference numbers will be used throughout the drawings to refer to the same or like parts.

The disclosed embodiments relate to methods, systems, and computer-readable medium for determining a vehicle orientation. Embodiments of the present disclosure can be implemented in a connected device with a satellite signals receiver and configured to be mounted inside the vehicle. Embodiments of the present disclosure allow for determining the vehicle orientation when satellite signals received by the connected device are insufficient for determining the orientation of the vehicle.

As described herein, a vehicle orientation or an orientation of a vehicle may refer to a vehicle's heading or the direction to which the nose or the front of the vehicle is pointed. A connected device may refer to any device connected to a network, such as a smartphone, a tablet, a portable laptop, a navigation device, and the like that has one or more satellite signals receivers. The connected device may also be further equipped with a communication transceiver for providing other location-based services, such as WiFi positioning and cell tower triangulation, that can determine and record the location of the connected device. A location of the connected device and thus the location of the vehicle may be determined based on the satellite signals received by the connected device and/or provided by the location-based services. A navigation map may be stored locally in a storage device of the connected device or downloaded in real-time by a navigation app of the connected device.

As described herein, insufficient satellite signals may refer to a complete loss of satellite signals or weak satellite signals that, by themselves, cannot accurately positioning a device. Alternatively, insufficient satellite signals may refer to satellite signals received by a satellite signals receiver of a connected device that do not allow for determining the vehicle location with the ordinary level of accuracy of satellite navigation localization (e.g., an accuracy of about 3 to about 5 meters). Such insufficient satellite signals thus cannot be used for determining the vehicle orientation with desired accuracy.

For example, when the vehicle is moving in a tunnel, satellite signals may be blocked. In some situations, satellite signals received by a connected device mounted to a vehicle are insufficient if the vehicle moves at a reduced speed such that the position change of the vehicle over a period of time for updating the vehicle location is smaller than the accuracy of global navigation localization. In some other situations, the vehicle location determined using satellite signals received by the connected device may move or jump around the real location for a temporary period of time. In these and similar situations, the satellite signals are insufficient for determining the vehicle orientation.

As described herein, a navigation app may be a location-based service app installed on the connected device that can display a navigation map, the vehicle location, and/or the vehicle orientation in real-time. A navigation app may be any other service app, such as a ride-sharing app (e.g., Uber™ App, Lyft™ App, DiDi™ App), that use location-based services. A navigation map may be stored locally in a storage device in the connected device prior to use, or downloaded and/or updated during use by the connected device with access to the network.

As described herein, the navigation app may use any space-based radio-navigation system, such as the Global Positioning System (GPS), the Global Navigation Satellite System (GLONASS), and the BeiDou Navigation Satellite System (BDS). Satellite signals refer to the signals used by the selected space-based radio-navigation system that provide positioning information. For example, GPS signals may be received by the connected device to determine and update the location of the connected and thus the location of the vehicle.

Figure 1:
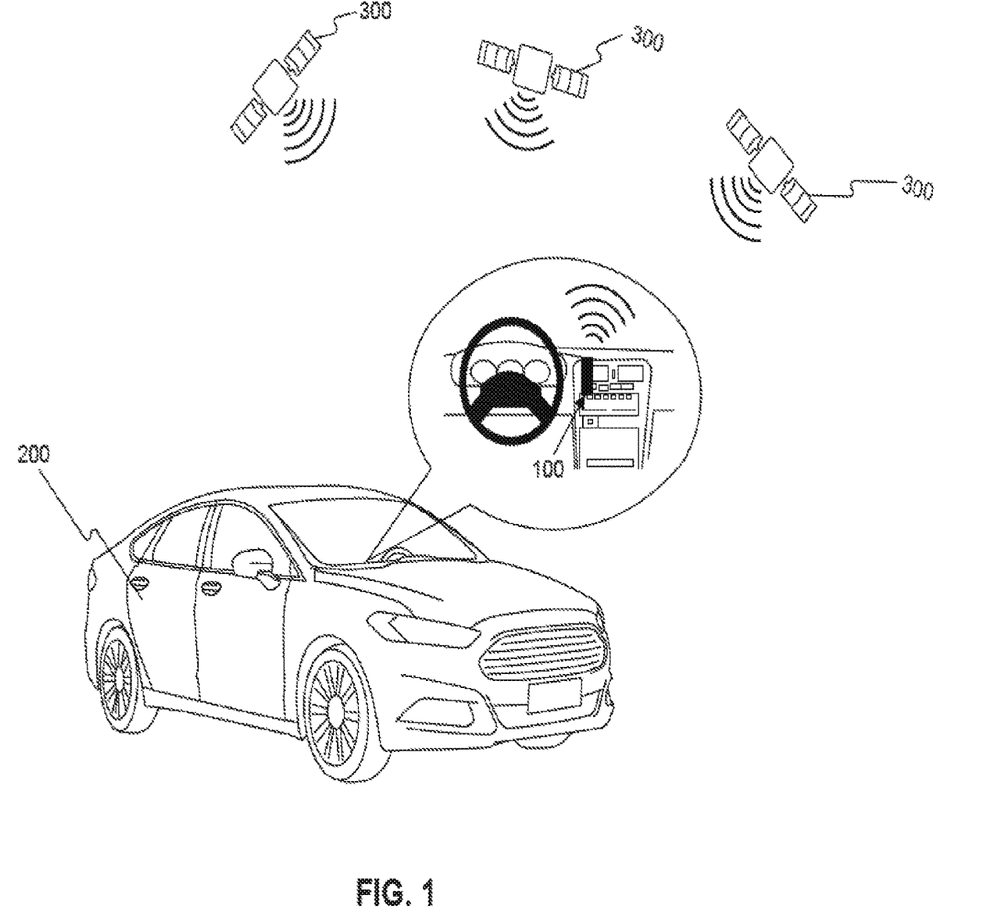
FIG. 1 is a diagram illustrating an exemplary scheme for determining a vehicle orientation, according to embodiments of the present disclosure.

FIG. 1 is a graphical illustration for an exemplary scheme for determining a vehicle orientation, according to embodiments of the present disclosure. As shown in FIG. 1, a connected device 100, such as a tablet or a smartphone, is mounted inside a vehicle 200 to assist the driver with navigation. For example, connected device 100 may be removably mounted in a cradle or other suitable mounting structures affixed to vehicle 200 (not shown) such that connected device 100 is positioned relatively stationary with respect to vehicle 200. Connected device 100 may be mounted in a vertical position or in a horizontal position with the screen display presented to the driver. Thus, the location of connected device 100 can be treated as the location of vehicle 200. Connected device 100 may display locally stored or navigation maps downloaded from the Internet in real-time, and may present audio and/or visual routing and direction information to the driver. In some embodiments, connected device 100 includes a satellite signals receiver for receiving satellite signals from one or more satellites 300. Connected device 100 may further include one or more inertial sensors for measuring the movement status of vehicle 200. Various components of connected device 100 and their functions are further described below with reference to FIG. 4.

According to some embodiments, the orientation of vehicle 200 can be determined based on a first relative orientation of connected device 100 to vehicle 200 and a second relative orientation of connected device 100 to a reference object, such as the geographical north of the earth. As described above, connected device 100 is mounted to and positioned relatively stationary with respect to vehicle 200. Thus, as vehicle 200 moves, such as turning, switching lanes, or shifting from side to side, the first relative orientation of connected device 100 relative to vehicle 200 (hereafter, "first relative orientation") stays substantially the same. However, the second relative orientation of connected device 100 relative to the reference object (hereafter, "second relative orientation"), such as the geographical north of the earth, changes with the movement of vehicle 200. When satellite signals are insufficient, some embodiments may determine orientation of vehicle 200 by determining the first relative orientation and the second relative orientation discussed above.

In some embodiments, the first relative orientation can be determined from a rotation matrix describing a rotation from a coordinate system of connected device 100 to a coordinate system of vehicle 200 in the three-dimensional space. Also, in some embodiments, the second relative orientation can be determined from a rotation matrix describing a rotation between the coordinate system of connected device 100 to a reference coordinate system of the earth in the three-dimensional space. The vehicle orientation (the orientation of vehicle 200 relative to the reference object or in reference to the reference coordinate system) can then be determined based on the first relative orientation and the second relative orientation.

FIGS. 2A-3B graphically illustrate the exemplary coordinate systems used by embodiments of the present disclosure for determining the first and second relative orientations and the orientation of vehicle 200.

Figure 2A:
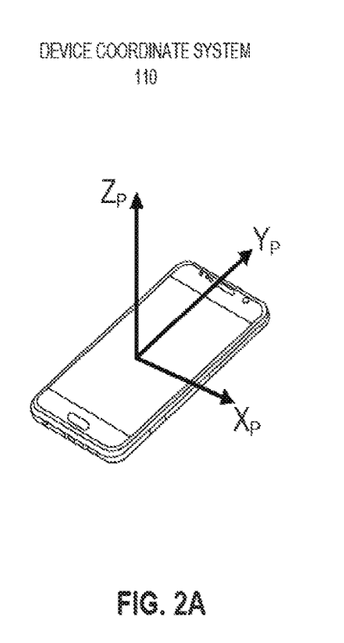
FIG. 2A is a diagram illustrating an exemplary coordinate system of a vehicle, according to embodiments of the present disclosure.

FIG. 2A graphically illustrates an exemplary device coordinate system 110 of connected device 100. Device coordinate system 110 is a three-axis coordinate system using the screen display as a reference. The x-axis, $X_P$, represents the horizontal direction from left to right of the screen display, the y-axis, $Y_P$, represents the vertical direction from bottom to top of the screen display, and the z-axis, $Z_P$, represents the direction perpendicular to and from the inside out relative to the surface of the screen display. When connected device 100 rotates, the axes of device coordinate system 110 rotate with the change of direction of the screen display. The axes of device coordinate system 110 typically follow the right-hand rule. Device coordinate system 110 is also the coordinate system used by the inertial sensors of connected device 100. Therefore, measurements of the inertial sensors of connected device 100, such as accelerations of connected device 100 in three dimensions, are measured in reference to device coordinate system 110.

Figure 2B:
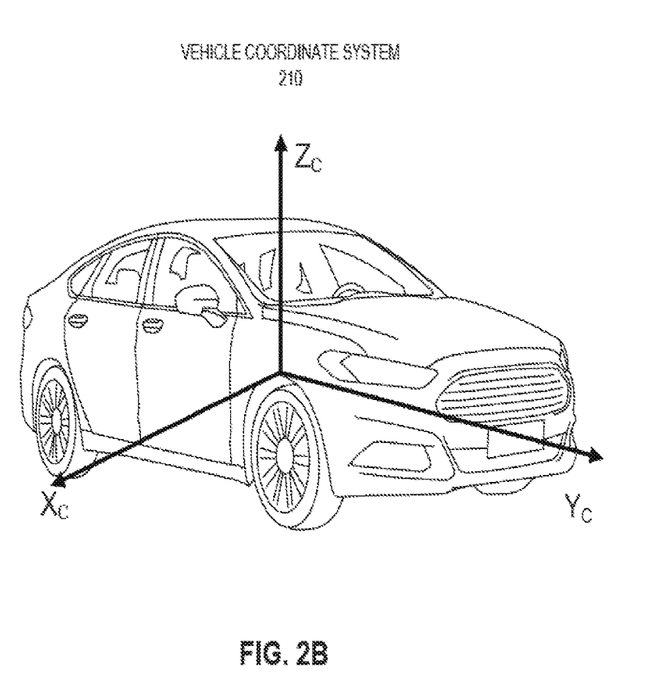
FIG. 2B is a diagram illustrating an exemplary coordinate system of a connected device, according to embodiments of the present disclosure.

FIG. 2B graphically illustrates an exemplary vehicle coordinate system 210 of vehicle 200. Vehicle coordinate system 210 is also a three-axis coordinate system and typically follows the right-hand rule having the center of gravity of vehicle 200 as the origin. When vehicle 200 drives on a surface of a road, the x-axis, $X_C$, represents the horizontal direction from left to right of vehicle 200, the y-axis, $Y_C$, represents the direction from back to front of vehicle 200, and the z-axis, $Z_C$, represents the direction from bottom to top of vehicle 200 perpendicular to the surface of the road. If the road is horizontal, the z-axis, $Z_C$, is aligned with the direction of gravitational acceleration of the earth.

Figure 3A:
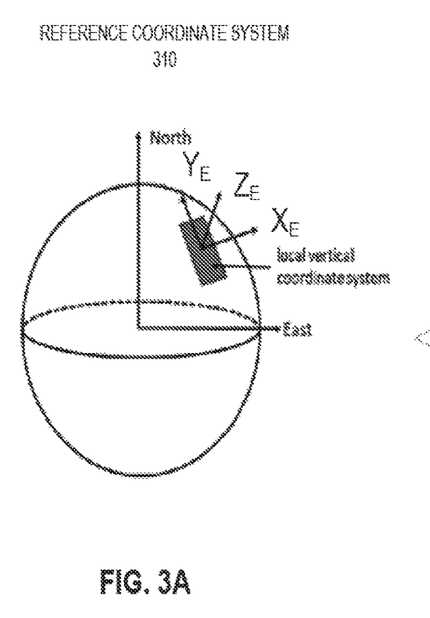
FIG. 3A is a diagram illustrating an exemplary coordinate system of the earth, according to embodiments of the present disclosure.
Figure 3B:
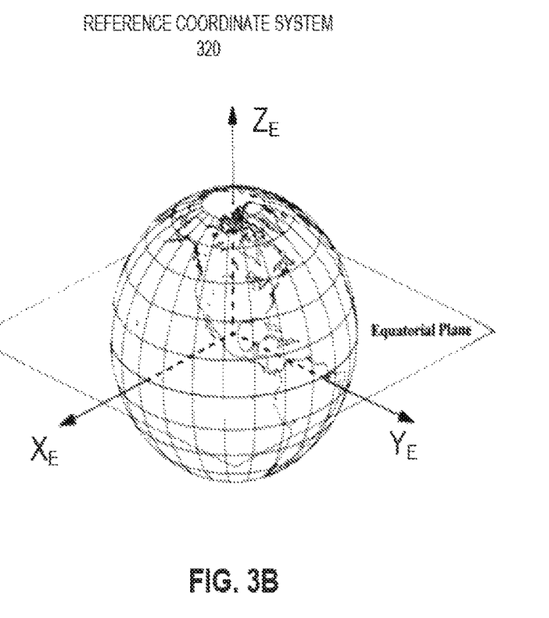
FIG. 3B is a diagram illustrating another exemplary coordinate system of the earth, according to embodiments of the present disclosure.

FIGS. 3A and 3B graphically illustrate two examples of a reference coordinate system of the earth typically used by space-based radio-navigation systems, such as GPS systems, for determining positions of devices that can receive satellite signals, such as connected device 100, on the earth. When the received satellite signals are sufficient, the position change of vehicle 200 in reference coordinate system 310 over a period of time can be determined based on the satellite signals.

FIG. 3A graphically illustrates an exemplary reference coordinate system 310 of the earth. Reference coordinate system 310 of FIG. 3A is a three-axis local vertical coordinate system, where the x-axis, $X_E$, represents the direction towards the east, the y-axis, $Y_E$, represents the direction towards the north, and the z-axis, $Z_E$, represents the direction perpendicular to the tangential plane at the location of vehicle 200. The origin of reference coordinate system 310 is typically the center of gravity of vehicle 200. The z-axis, $Z_E$, of reference coordinate system 310 aligns with the z-axis, $Z_C$, of vehicle coordinate system 210, while the x-axes, $X_E$, and y-axes, $Y_E$, of reference coordinate system 310 are at an angle with the x-axis, $X_C$, and the y-axis, $Y_C$, of vehicle coordinate system 210 respectively. Here, the vehicle orientation may refer to the orientation of vehicle 200 referenced to the geographical north or the y-axis, $Y_E$, of reference coordinate system 310 of FIG. 3A. In the instances where vehicle 200 moves toward the geographical north and connected device 100 is mounted in a vertical position, axes of reference coordinate system 310 of FIG. 3A align with the axes of vehicle coordinate system 210 of FIG. 2B.

FIG. 3B graphically illustrates another exemplary reference coordinate system 310 of the earth. Reference coordinate system 320 of FIG. 3B is a three-axis earth-centered inertial coordinate system, where the origin is at the center of the mass of the earth and the x-y plane coincides with the earth's equatorial plane. In reference coordinate system 320, the x axis, $X_E$, permanently points to a fixed direction relative to the celestial sphere (e.g., the prime meridian) while the z axis, $Z_E$, is vertical to the equatorial plane and extends through the North Pole. The x-axes, $X_E$, y-axes, $Y_E$, and the z-axis, $Z_E$, of reference coordinate system 320 of FIG. 3B are typically at an angle with the x-axis, $X_C$, the y-axis, $Y_C$, and the z-axis, $Z_C$, of vehicle coordinate system 210 respectively. Here, the vehicle orientation may refer to the orientation of vehicle 200 relative to the geographical north or the z-axis, $Z_E$, of reference coordinate system 320 of FIG. 3B. As described herein, any description with reference to reference coordinate system 310 in the present disclosure equally applies to reference coordinate system 320.

In some embodiments, the vehicle orientation can be determined from a rotation matrix, $_C^E R$, that can rotate vehicle coordinate system 210 to align with reference coordinate system 310 in the three-dimensional space. As described herein, a rotation matrix describes a three-dimensional rotation of an Euclidean coordinate system by three angles, $\alpha$, $\beta$, $\gamma$, respectively about the x, y, or z axis of the coordinate system. For example, a rotation matrix, $_A^B R$, for rotating a first coordinate system A to a second coordinate system B in the three-dimensional space can be defined as $$\cos \beta \cos \gamma + \sin \alpha \sin \beta \sin \gamma \cos \alpha \sin \gamma - \sin \beta \cos \gamma + \sin \alpha \cos \beta \sin \gamma - \cos \beta \sin \gamma + \sin \alpha \sin \beta \cos \gamma \cos \alpha \cos \gamma \sin \beta \sin \gamma + \sin \alpha \cos \beta \cos \gamma, \cos \alpha \sin \beta - \sin \alpha \cos \alpha \cos \beta$$

where angles, $\alpha$, $\beta$, $\gamma$, are respective counterclockwise rotation angles about the x, y, and z axes of the first coordinate system A. In such instances, a vector in the first coordinate system A, $V_A$, becomes a vector, $V_B$, in the second coordinate system B, where $V_B = _A^B R V_A$.

In other words, if the rotation matrix, $_A{}^B R$, is known, a relative orientation of vector, $V_A$, in coordinate system A can be determined from the rotation matrix, $_A{}^B R$, and vector, $V_B$, in coordinate system B. For example, when the rotation matrix, $_C{}^E R$, that rotates vehicle coordinate system 210 (e.g., FIG. 2B) to align with reference coordinate system 310 (e.g., FIG. 3A) is known, the vehicle orientation (or the orientation of the velocity vector or acceleration vector of vehicle 200) can be determined from the rotation matrix, $_C{}^E R$ and the geographical north or a unit vector along the y-axis, $Y_E$, of reference coordinate system 310.

In other embodiments, when satellite signals received by connected device 100 are sufficient, the vehicle orientation in reference coordinate system 310 can be determined based on the satellite signals. For example, when satellite signals are sufficient, the position of vehicle 200 in reference coordinate system 310 over a period of time can be tracked based on the satellite signals. Then, the vehicle orientation in reference coordinate system 310 can be determined based on the position change of vehicle 200 over the period of time. In such instances, the vehicle orientation in reference coordinate system 310 (e.g., defined by angles α, β, γ) can be used to obtain the rotation matrix, $_C{}^E R$, for rotating vehicle coordinate system 210 to align with reference coordinate system 310.

In some embodiments, the first relative orientation may be determined from a rotation matrix, $_P{}^C R$ between device coordinate system 110 and vehicle coordinate system 210. Embodiments for determining the first relative orientation are described below with reference to FIG. 6.

In some embodiments, when the satellite signals are sufficient such that the vehicle orientation in reference coordinate system 310 can be determined from the satellite signals, and when the first relative orientation is determined, the second relative orientation can be determined based on the first relative orientation and the vehicle orientation.

In other embodiments, the second relative orientation may be determined from the rotation matrix, $_P{}^E R$. More details about the determination are described below with reference to FIGS. 7 and 8.

Figure 4:
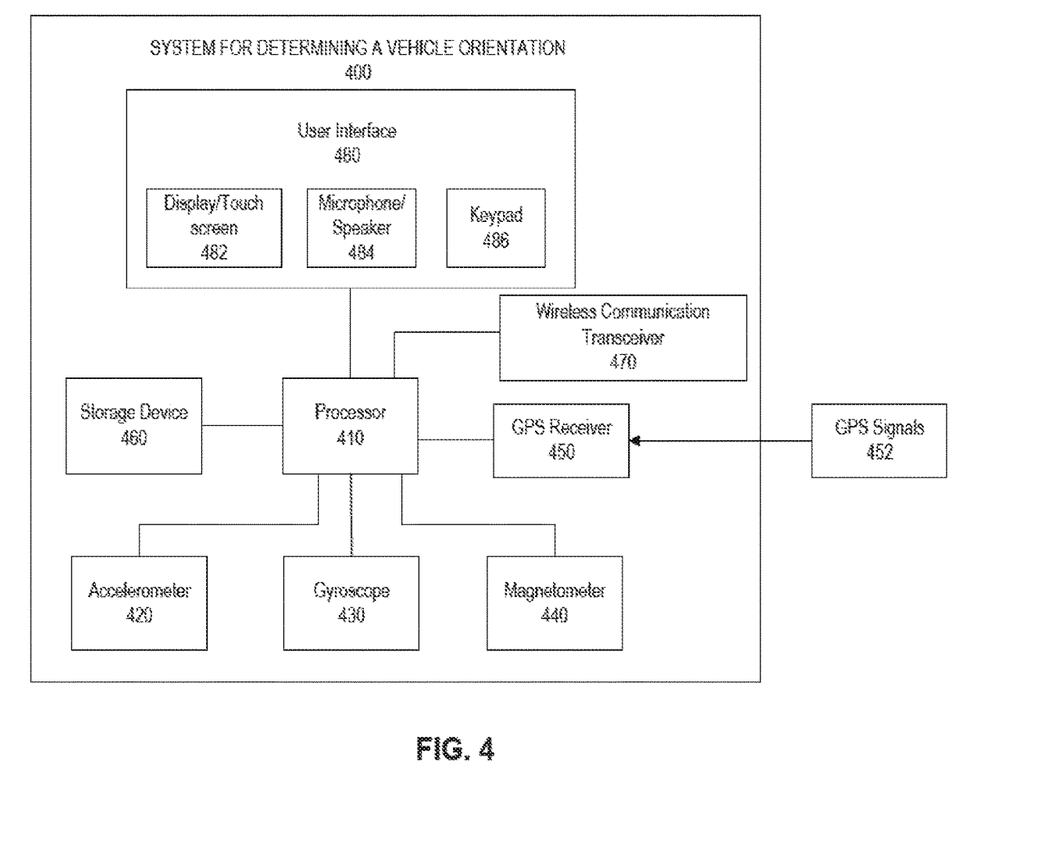
FIG. 4 is a block diagram of an exemplary system for determining a vehicle orientation, according to embodiments of the present disclosure.

FIG. 4 is a block diagram of an exemplary system 400 for determining a vehicle orientation, according to embodiments of the present disclosure. System 400 may be implemented in connected device 100, such as a smartphone, a tablet, or a portable laptop. As shown in FIG. 4, system 400 includes a processor 410, one or more inertial sensors including at least one of an accelerometer 420, a gyroscope 430, and a magnetometer 440, and a satellite signals receiver 450.

Accelerometer 420 and gyroscope 430 may be referred to as an inertial measurement unit (IMU). Both accelerometer 420 and gyroscope 430 may generate three-dimensional measurements in device coordinate system 110, such as in the form of measurement vectors. Processor 410 receives the three-dimensional measurements made by accelerometer 420 and gyroscope 430 and uses the measurements to determine the orientation of vehicle 200.

For example, processor 410 uses the three-dimensional measurements made by accelerometer 420 to determine one or more acceleration vectors that represent the direction and magnitude of acceleration of connected device 100 along the three axes of device coordinate system 110. As described herein, the acceleration vector is negative when the vehicle 200 decelerates. Processor 410 further uses the measurements made by accelerometer 420 and/or gyroscope 430 to determine one or more gravity vectors that represent the direction and magnitude of gravitational acceleration in device coordinate system 110.

In some embodiments, as shown in FIG. 4, system 400 may further include a magnetometer 440. Processor 410 may use measurements of magnetometer 440 to determine the second relative orientation. Processor 410 may further use the determined second relative orientation to determine the rotation matrix, $_P{}^E R$.

Additionally, processor 410 may receive satellite signals 452 from satellite signals receiver 450 for determining the orientation of vehicle 200. Processor 410 may receive satellite signals 452 over a period of time, T, e.g., ranging from about 1 second to about 5 seconds. Processor 410 may determine the position change of vehicle 200 over the period of time based on satellite signals 452 and then determine if satellite signals 452 are sufficient. For example, satellite signals 452 are determined as sufficient if the determined position change is more than about 5 meters over about 3 seconds. If satellite signals 452 are sufficient, processor 410 may further use the position change to determine the orientation of vehicle 200 at the end of the period of time, T.

As shown in FIG. 4, system 400 further includes a storage device 460. Storage device 460 may store data representing the exemplary coordinate systems of FIGS. 2A-3B, data representing measurements made by accelerometer 420, gyroscope 430, and/or magnetometer 440, and satellite signals 452 received by satellite signals receiver 450. As described herein, storage device 460 may also store other suitable types of data for determining the position and orientation of vehicle 200, such as a navigation map, data and instructions for operating a navigation app on connected device 100, data for displaying the position and orientation of vehicle 200 on the navigation map, and/or data and instructions for processor 410 to determine orientation of vehicle 200.

As described herein, storage device 460 may be implemented as any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), or a read-only memory (ROM).

In some embodiments, as shown in FIG. 4, system 400 further includes a wireless communication transceiver 470 to receive and/or provide navigation maps and/or other wireless location services, such as WiFi positioning and cell tower triangulation. Wireless communication transceiver 470 may communicate with various wireless networks, such as a wireless wide area network (WWAN), a wireless local area network (WLAN), a wireless personal area network (WPAN), etc. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), etc. A WLAN may be an IEEE 802.11x network, and a WPAN maybe a Bluetooth Network, an IEEE 802.15x, or some other types of personal area network. The data received by wireless communication transceiver 470 may be stored in storage device 460 and used by processor 410 for determining the location and orientation of vehicle 200.

As shown in FIG. 4, system 400 further includes a user interface 480. User interface 480 includes a display 482 for displaying to a driver of vehicle 200 a navigation map, the position of vehicle 200, the routing and direction of vehicle 200, the orientation of vehicle 200, etc. Display 482 can be a touch screen that allows for gesture-handling navigation controls, such as zoom, pan, and stroll of the navigation map. User interface 480 may further include microphones and/or speakers 484 to present audio information of the routing, direction, and orientation information of vehicle 200 to the driver. In some embodiments, user interface 480 may have a keypad 486 and/or one or more control buttons that allow the driver to input the navigation controls, adjust navigation settings, etc.

Figure 5:
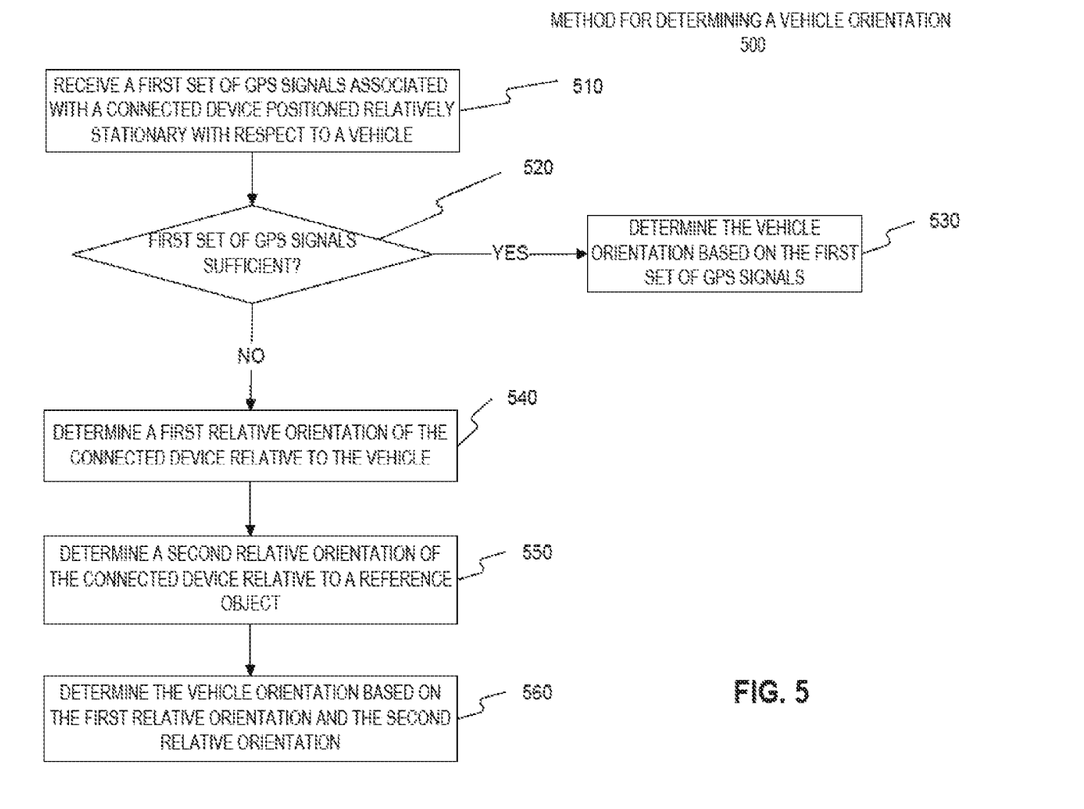
FIG. 5 is a flowchart of an exemplary method for determining a vehicle orientation, according to embodiments of the present disclosure.

System 400 described herein may be utilized in a variety of systems and methods for determining vehicle orientation. FIG. 5 is a flowchart of an exemplary method 500 for determining a vehicle orientation, according to embodiments of the present disclosure. Method 500 for determining vehicle orientation may use system 400 or one or more features of the embodiments of system 400 described above.

Exemplary embodiments of method 500 are described below with reference to FIGS. 5-8.

Processor 410 may perform method 500 for determining a vehicle orientation. As shown in FIG. 5, method 500 includes steps 510-560. In step 510, processor 410 receives a first set of satellite signals 452 associated with connected device 100 that is positioned relatively stationary with respect to vehicle 200. For example, satellite receiver 450 may receive a first set of satellite signals 452 and transmit the first set of satellite signals 452 to processor 410. The first set of satellite signals 452 may be acquired over a period of time, T, and may be stored in storage device 460.

In step 520, processor 410 determines whether the first set of satellite signals 452 are sufficient. If processor 410 determines the first set of satellite signals 452 are sufficient, processor 410 proceeds to step 530, in which processor 410 determines the vehicle orientation based on the first set of satellite signals 452. For example, if the position change of vehicle 200 relative to a reference object over the period of time, is above a predetermined threshold distance and if the speed of vehicle 200 is above a predetermined threshold speed, e.g., a change of more than about 5 meters over about 3 seconds at a speed above about 5 m/s, processor 410 then determines the first set of satellite signals 452 are sufficient. In step 530, processor 410 may determine the vehicle orientation based on the position change of vehicle 200 over the period of time, T. This determined vehicle orientation is the orientation of vehicle 200 at the end of the period of time, T, in reference coordinate system 310.

As described herein, most of the time satellite signals 452 received by connected device 100 may be sufficient such that the orientation of vehicle 200 can be determined solely based on satellite signals 452. But in some instances, satellite signals 452 are insufficient for determining the orientation of vehicle 200. For example, when satellite signals 452 are blocked, such as when vehicle 200 is moving in a tunnel, satellite signals 452 may be substantially weak or unavailable. Satellite signals 452 are also insufficient when vehicle 200 turns at a reduced speed such that the position change of vehicle 200 during the period of time, T, is below a predetermined threshold distance and if the speed of vehicle 200 is lower than a predetermined threshold speed, e.g., a position change of less than about 5 meters in about 3 seconds at a speed below about 5 m/s. Additionally, satellite signals 452 are insufficient when the location of vehicle 200 determined using satellite signals 452 moves or jumps around the real location for a temporary period of time. For example, the location of vehicle 200 changes for over about 25 meters within 2 seconds, corresponding to a speed of 90 km/h, which is typically unrealistic in an urban area. In these and similar situations where satellite signals 452 are insufficient, processor 410 proceeds to step 540.

In step 540, processor 410 determines a first relative orientation of connected device 100 relative to vehicle 200. As described above, the first relative orientation during the traveling of vehicle 200 stays substantially the same. Thus, once the first relative orientation is determined, it can be used at other time points determine the vehicle orientation.

In step 550, processor 410 determines a second relative orientation of connected device 100 relative to a reference object, such as the geographical north. Because connected device 100 is positioned relatively stationary with respect to vehicle 200, when vehicle 200 moves with respect to the reference object, the second relative orientation also changes and needs to be determined for different time points.

In step 560, processor 410 determines the vehicle orientation based on the first relative orientation determined in step 540 and the second relative orientation determined in step 550.

Details of steps 540-560 are further described below with reference to FIGS. 6-8.

Figure 6:
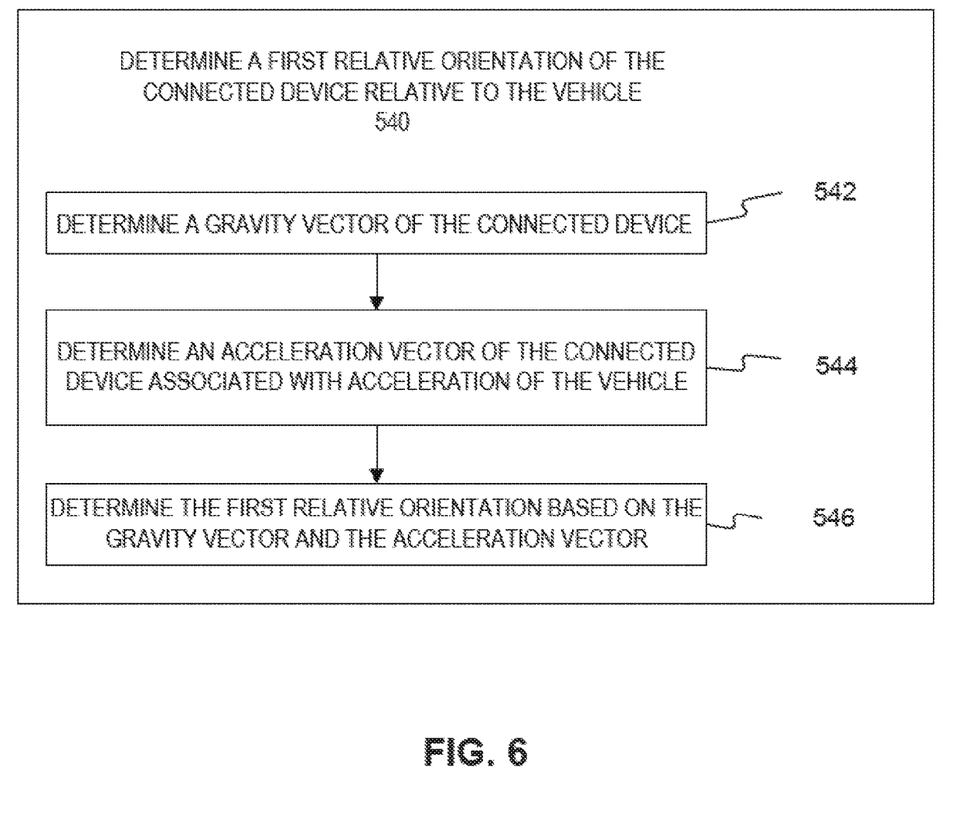
FIG. 6 is a flowchart of an exemplary method for determining a relative orientation of a connected device relative to a vehicle, according to embodiments of the present disclosure.

As shown in FIG. 6, to determine the first relative orientation, step 540 may further include steps 542-546.

In step 542, processor 410 determines a gravity vector of connected device 100. The gravity vector represents the average magnitudes of gravitational acceleration along the three axes, $X_P$, $Y_P$, and $Z_P$, of device coordinate system 110. Processor 410 uses the measurements by accelerometer 420 and/or gyroscope 430 to determine the gravity vector when connected device 100 and vehicle 200 are stationary and when the received measurements are stable.

For example, after connected device 100 is mounted inside vehicle 200 and while vehicle 200 is stationary, processor 410 receives measurements from accelerometer 420 along the three axes, $X_P$, $Y_P$, and $Z_P$, for a period of time, such as about 3 seconds, and determines whether the measurements are stable. The measurements are determined by processor 410 as stable if certain predetermined conditions are met. For example, the measurements from accelerometer 420 are determined stable if the following two predetermined conditions are met. First, the absolute difference between the magnitude of a gravitational acceleration measurement at the beginning of the period of time and the magnitude of a gravitational acceleration measurement at the end of the period of time along each of the three axes, $X_P$, $Y_P$, and $Z_P$, is smaller than 0.1 m/s$^2$. Second, the absolute difference between the overall magnitude of gravitational acceleration and the nominal average value of gravitational acceleration at the earth's surface (e.g., 9.81 m/s$^2$) is smaller than 0.1 m/s$^2$. The overall magnitude of gravitational acceleration can be determined based on the magnitudes of acceleration measurements along the three axes, $X_P$, $Y_P$, and $Z_P$. As described herein, the overall magnitude of a vector may be the square root of the sum of the square of the magnitudes of the vector along the three axes of a coordinate system.

The measurements of accelerometer 420 can be regularly updated at a certain frequency, and processor 410 may use the updated measurements of accelerometer 420 that have been determined to be stable to determine average magnitudes of gravitational acceleration along the three axes. A gravity vector, $V_{gravity}$, can be determined based on the determined average magnitudes of gravitational acceleration.

In step 544, processor 410 determines an acceleration vector of connected device 100. As described above, because connected device 100 is mounted to vehicle 200 and positioned relatively stationary with respect to vehicle 200, when vehicle 200 moves and accelerates, connected device 100 also moves with the same acceleration. Thus, when vehicle 200 linearly accelerates (including negative acceleration or deceleration), measurements of accelerometer 420 of connected device 100 represent the accelerations of vehicle 200 and the gravitational accelerations along the three axes of device coordinate system 110. Processor 410 then determines the acceleration vector based on the measurements of accelerometer 420 and the gravity vector determined in step 542. As used herein, the acceleration vector of vehicle 200 is represented by $V_{acc}$.

For example, when vehicle 200 starts to move after being stationary, processor 410 receives measurements from accelerometer 420 for a period of time, such as 3 seconds. Processor 410 then obtains a linear accelerator vector $V_{acc\_linear}$ in device coordinate system 110 by subtracting respective average magnitudes of gravitational acceleration determined in step 542 from the measurements of accelerometer 420. Additionally, processor 410 may use the measurements of magnetometer 440 to determine the orientation of connected device 100 relative to the geographical north (or magnetic north) and its changes during the same period of time. If the overall magnitude of the linear accelerator vector $V_{acc\_linear}$ is greater than a predetermined threshold acceleration value, e.g., 0.5 m/s², and if the change of the relative orientation of connected device 100 relative to the geographical or magnetic north is less than about 10 degrees about each of the three axes, processor 410 may determine that vehicle 200 is moving in linear acceleration.

After determining that vehicle 200 is moving in linear acceleration, processor 410 may further determine the acceleration vector $V_{acc}$ in device coordinate system 110 based on the linear accelerator vector $V_{acc\_linear}$. For example, processor 410 may determine the linear accelerator vector $V_{acc\_linear}$ having an overall magnitude of over a predetermined threshold (e.g., 0.3 m/s²) as the acceleration vector $V_{acc}$ of vehicle 200. As described herein, acceleration vector $V_{acc}$ may have negative values that indicate deceleration of vehicle 200.

In some embodiments, processor 410 obtains a series of acceleration vectors $V_{acc}$, such as a hundred samples of acceleration vector $V_{acc}$, over a period of time, and determines an average acceleration vector $V_{ave\_acc}$ of vehicle 200.

In step 546, processor 410 determines the first relative orientation based on the gravity vector $V_{gravity}$ (step 542) and the acceleration vector $V_{acc}$ or the average acceleration vector $V_{ave\_acc}$ (step 544). As described above, the first relative orientation can be obtained from a rotation matrix, $_P^C R$.

The rotation matrix, $_P^C R$, in turn, can be determined from the gravity vector $V_{gravity}$ and the average acceleration vector $V_{ave\_acc}$. First, processor 410 determines a vector $V_{right}$, representing the horizontal direction from left to right of vehicle 200 as the cross product of the gravity vector $V_{gravity}$ and the average acceleration vector $V_{ave\_acc}$. Here, vector $V_{right}$ is perpendicular to both gravity vector $V_{gravity}$ and average acceleration vector $V_{ave\_acc}$. Then, processor 410 determines a vector $V_{up}$, representing a perpendicular direction pointing from bottom to top of vehicle 200 as the cross product of the vector $V_{right}$ and the average acceleration vector $V_{ave\_acc}$. Here, vector $V_{up}$ is perpendicular to both vector $V_{right}$ and average acceleration vector $V_{ave\_acc}$. As described herein, vectors $V_{right}$, $V_{ave\_acc}$, and $V_{gravity}$ are column vectors in device coordinate system 110. Finally, processor 410 determines the rotation matrix, $_P^C R$, by concatenating vectors $V_{right}$, $V_{ave\_acc}$, $V_{gravity}$ and transposing the matrix obtained from the concatenation, i.e., $_P^C R = [V_{right}\ V_{ave\_acc}\ V_{gravity}]^T$. The first relative orientation can then be obtained from the rotation matrix, $_P^C R$.

Figure 7:
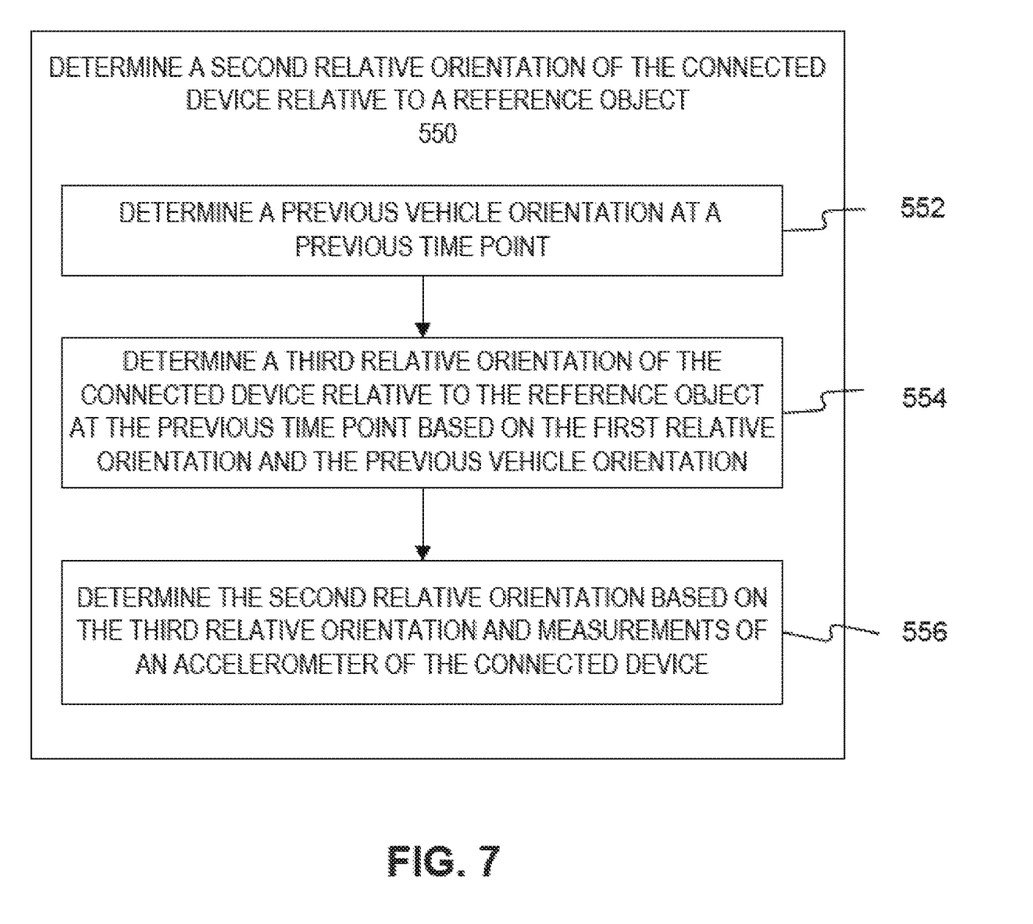
FIG. 7 is a flowchart of an exemplary method for determining a relative orientation of a connected device relative to a reference object, according to embodiments of the present disclosure.

As shown in FIG. 7, to determine the second relative orientation, step 550 may further include steps 552-556.

In step 552, processor 410 determines a previous vehicle orientation at a previous time point. As described above, during the traveling of vehicle 200, satellite signals 452 received by connected device 100 are generally sufficient such that the orientation of vehicle 200 can be determined from satellite signals 452. Processor 410 may determine and update the vehicle orientation when satellite signals 452 are sufficient in real-time. Sufficient satellite signals 452 and the vehicle orientation determined in real-time can be saved in storage device 460 for use by processor 410. In the instances where the first set of satellite signals 452 received by connected device 100 in step 510 are determined as insufficient in step 520, processor 410 may determine and/or use a previous vehicle orientation to determine the vehicle orientation at the present time point. An exemplary method for performing step 552 is further described below with reference to FIG. 8.

In step 554, processor 410 determines a third relative orientation of connected device 100 relative to the reference object at the previous time point based on the first relative orientation determined in step 540 and the previous vehicle orientation determined in step 552. Processor 410 can determine the third relative orientation from a rotation matrix, $_P^E R$, at the previous time point.

For example, processor 410 determines the rotation matrix, $_P^E R$, at the previous time point based on the rotation matrix, $_P^C R$, the rotation matrix, $_C^E R$, at the same time point, according to $_P^E R = _C^E R\ _P^C R$. The rotation matrix, $_P^C R$, is determined in step 540. The rotation matrix, $_C^E R$, can be obtained based on the previous vehicle orientation determined in step 552 when satellite signals 452 are sufficient at the previous time point. Processor 410 then further determines the third relative orientation from the rotation matrix, $_C^E R$, at the previous time point.

In step 556, processor 410 determines the second relative orientation based on the third relative orientation determined in step 554 and measurements of accelerometer 420 of connected device 100. Here, using rotation matrix, $_P^E R$ at the previous time point and measurements of accelerometer 420 over a period of time, processor 410 may estimate the rotation matrix, $_P^E R$ at the present time.

As a non-limiting example, processor 410 may use Kalman filtering to estimate the second relative orientation (or the rotation matrix, $_P^E R$) at the present time using a series of measurements of accelerometer 420 over time as present input measurements and the third relative orientation as the previous state. As described herein, processor 410 may use any type of predictive methods for determining the second relative orientation (or the rotation matrix, $_P^E R$) at the present time in step 556.

Alternatively, instead of steps 552-556, processor 410 may use measurements of magnetometer 440 to determine the second relative orientation. Processor 410 may further determine the rotation matrix, $_P^E R$.

In some embodiments, the determination of the vehicle orientation in step 560, further includes determining the rotation matrix, $_C^E R$, for rotating vehicle coordinate system 210 to align with reference coordinate system 310 at the present point and determining the vehicle orientation from the rotation matrix, $_C^E R$. For example, processor 410 determines the rotation matrix, $_C^E R$, at the present time point based on the rotation matrix, determined in step 540 and the rotation matrix, $_P^E R$, at the present time point estimated in step 550, where $_C^E R = _P^E R (_P^C R)^{-1}$. Processor 410 then determines the vehicle orientation from the rotation matrix, $_C^E R$, at the present time point.

Figure 8:
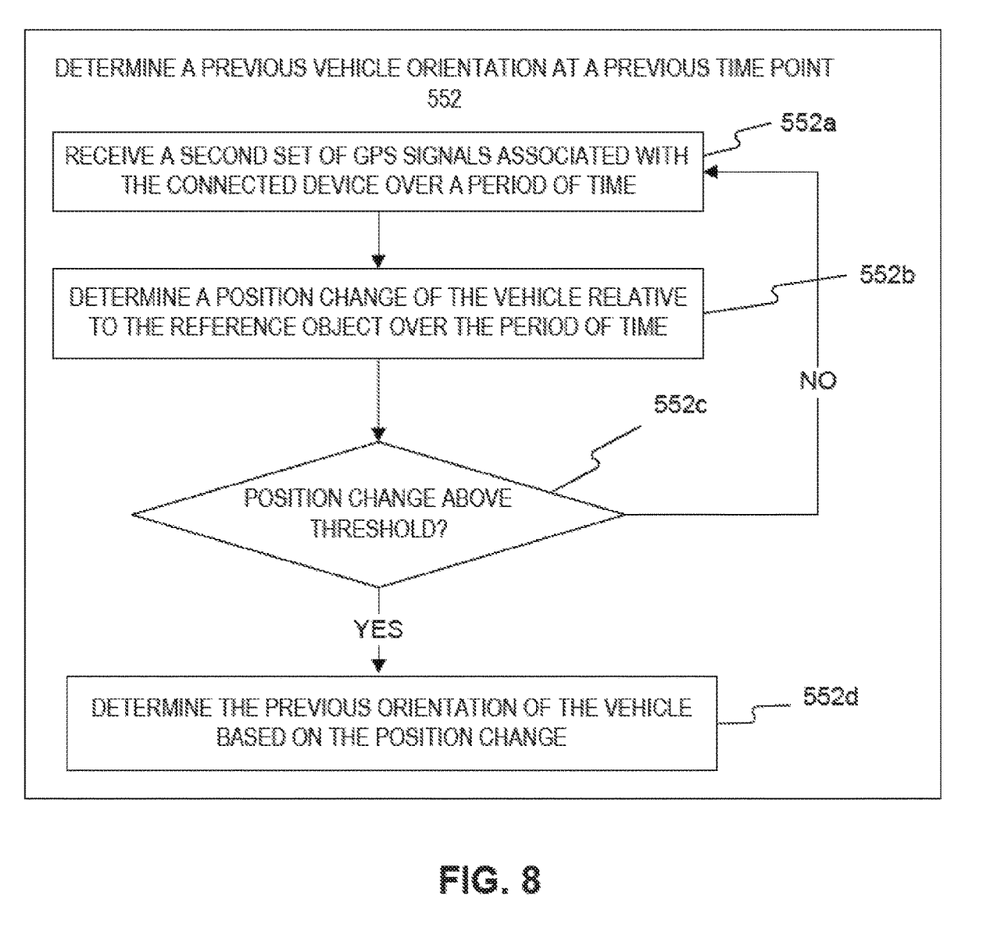
FIG. 8 is a flowchart of an exemplary method for determining a vehicle orientation at a previous time point, according to embodiments of the present disclosure.

As shown in FIG. 8, to determine a previous vehicle orientation at a previous time point when satellite signals 452 are sufficient, step 552 may further include steps 552a-552d. As described herein, steps 552a-552d may be performed by processor 410 in real-time when satellite signals 452 are sufficient, and may be performed by processor 410 before a previous time point.

In step 552a, processor 410 obtains a second set of satellite signals 452 over a period of time prior to the previous time point. In step 552b, processor 410 determines a position change of vehicle 200 relative to the reference object over the period of time. In step 552c, similar to step 520, processor 410 determines if the position change of vehicle 200 over the period of time is above a predetermined threshold distance, e.g., a change of more than about 5 meters over about 3 seconds. Additionally or alternatively, processor 410 may determine if the speed of vehicle 200 is above a predetermined threshold speed, e.g., a speed above about 5 m/s. If the result in step 552c is positive, processor 410 proceeds to step 552d and determines the vehicle orientation at the previous time point based on the position change of vehicle 200. If the result in step 552c is negative, processor 410 may return to step 552a and obtain another set of satellite signals 452 previously received.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. In some embodiments, the computer-readable medium may be storage device 460 having the computer instructions stored thereon, as disclosed. In other embodiments, the computer-readable medium may be a disc or a flash drive having the computer instructions stored thereon.

The computer-readable storage medium may refer to any type of non-transitory memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, removable and non-removable media. The information and/or data storage can be implemented with any method or technology. Information and/or data may be modules of computer-readable instructions, data structures, and programs, or other types of data. Examples of a computer-readable storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a cache, a register, a compact disc read-only memory (CD-ROM), or any other non-transitory media that may be used to store information capable of being accessed by a computer device.

The foregoing descriptions are only for purposes of illustration. The descriptions are neither exhaustive nor limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A computer-implemented method for determining a vehicle orientation, comprising:
   receiving a first set of satellite signals associated with a connected device mounted inside a vehicle;
   determining that the first set of satellite signals is insufficient to determine the vehicle orientation; and
   determining the vehicle orientation based on a first relative orientation of the connected device relative to the vehicle and a second relative orientation of the connected device relative to a reference object, wherein the determining the vehicle orientation comprises:
  determining a previous vehicle orientation at a previous time point; and
  determining a third relative orientation of the connected device relative to the reference object at the previous time point based on the first relative orientation and the previous vehicle orientation, to determine the second relative orientation.

2. The computer-implemented method of claim 1, wherein the reference object is the earth.

3. The computer-implemented method of claim 1, further comprising determining the first relative orientation, including:
  determining a gravity vector of the connected device;
  determining an acceleration vector of the connected device associated with acceleration of the vehicle; and
  determining the first relative orientation based on the gravity vector and the acceleration vector.

4. The computer-implemented method of claim 3, wherein the gravity vector is determined based on measurements of a gyroscope and/or an accelerometer of the connected device.

5. The computer-implemented method of claim 3, wherein the acceleration vector is determined based on measurements of an accelerometer of the connected device.

6. The computer-implemented method of claim 1, wherein the determining the second relative orientation further includes determining the second relative orientation based on the third relative orientation and measurements of an accelerometer of the connected device.

7. The computer-implemented method of claim 1, wherein the determining the previous vehicle orientation includes:
  receiving a second set of satellite signals associated with the connected device over a period of time;
  determining a position change of the vehicle relative to the reference object over the period of time; and
  determining the previous orientation of the vehicle based on the position change if the position change is above a predetermined threshold.

8. The computer-implemented method of claim 1, further comprising determining the vehicle orientation based on the first set of satellite signals if the first set of satellite signals are sufficient.

9. A system for determining a vehicle orientation, the system comprising:
  a processor; and
  at least one storage device coupled to the processor;
  wherein the processor is configured to:
    receive a first set of satellite signals associated with a connected device mounted inside a vehicle;
    determine that the first set of satellite signals is insufficient to determine the vehicle orientation; and
    determine the vehicle orientation based on a first relative orientation of the connected device relative to the vehicle and a second relative orientation of the connected device relative to a reference object, wherein determining the vehicle orientation comprises:
      determining a previous vehicle orientation at a previous time point; and
      determining a third relative orientation of the connected device relative to the reference object at the previous time point based on the first relative orientation and the previous vehicle orientation, to determine the second relative orientation.

10. The system of claim 9, wherein the reference object is the earth.

11. The system of claim 9, wherein to determine the first relative orientation, the processor is further configured to:
  determine a gravity vector of the connected device;
  determine an acceleration vector of the connected device associated with acceleration of the vehicle; and
  determine the first relative orientation based on the gravity vector and the acceleration vector.

12. The system of claim 11, wherein the gravity vector is determined based on measurements of a gyroscope and/or an accelerometer of the connected device.

13. The system of claim 9, wherein the processor is further configured to determine the second relative orientation based on the third relative orientation and measurements of an accelerometer of the connected device.

14. The system of claim 9, wherein in determining the previous vehicle orientation, the processor is further configured to
  receive a second set of satellite signals associated with the connected device over a period of time;
  determine a position change of the vehicle relative to the reference object over the period of time; and
  determine the previous orientation of the vehicle based on the position change if the position change is above a predetermined threshold.

15. The system of claim 9, wherein the processor is further configured to determine the vehicle orientation based on the first set of satellite signals if the first set of satellite signals are sufficient.

16. A non-transitory computer-readable storage medium containing instructions that, when executed by at least one processor, cause the at least one processor to perform a method for determining a vehicle orientation, the method comprising:
  receiving a first set of satellite signals associated with a connected device mounted inside a vehicle;
  determining that the first set of satellite signals is insufficient to determine the vehicle orientation; and
  determining the vehicle orientation based on a first relative orientation of the connected device relative to the vehicle and a second relative orientation of the connected device relative to a reference object, wherein the determining the vehicle orientation comprises:
    determining a previous vehicle orientation at a previous time point; and
    determining a third relative orientation of the connected device relative to the reference object at the previous time point based on the first relative orientation and the previous vehicle orientation, to determine the second relative orientation.

\* \* \* \* \*